United States Patent
Kulkarni et al.

(10) Patent No.: US 11,791,554 B2
(45) Date of Patent: Oct. 17, 2023

(54) FLEXIBLE RADIO ASSIGNMENT WITH BEAMSTEERING ANTENNAS

(71) Applicant: Cisco Technology, Inc., San Jose, CA (US)

(72) Inventors: Santosh B. Kulkarni, Sunnyvale, CA (US); Vishal S. Desai, San Jose, CA (US); Pooya Monajemi, San Jose, CA (US); Young Il Choi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 125 days.

(21) Appl. No.: 17/457,330

(22) Filed: Dec. 2, 2021

(65) Prior Publication Data

US 2023/0178890 A1    Jun. 8, 2023

(51) Int. Cl.
*H04W 16/28* (2009.01)
*H01Q 3/36* (2006.01)

(52) U.S. Cl.
CPC .............. *H01Q 3/36* (2013.01); *H04W 16/28* (2013.01)

(58) Field of Classification Search
CPC ................................. H01Q 3/36; H04W 16/28
See application file for complete search history.

(56) References Cited

U.S. PATENT DOCUMENTS

| | | | |
|---|---|---|---|
| 6,504,517 B1 * | 1/2003 | Liu | H01Q 1/246 343/893 |
| 6,738,019 B1 | 5/2004 | Luz et al. | |
| 9,479,241 B2 | 10/2016 | Pabla | |
| 10,129,887 B2 | 11/2018 | Pabla | |
| 10,181,891 B2 * | 1/2019 | Islam | H04W 40/248 |
| 10,433,189 B2 | 10/2019 | Desai et al. | |
| 11,024,961 B2 | 6/2021 | Anderson et al. | |
| 2003/0164791 A1 * | 9/2003 | Shinoda | H01Q 3/2605 342/149 |
| 2004/0157645 A1 | 8/2004 | Smith et al. | |
| 2014/0029450 A1 | 1/2014 | Vitek | |
| 2014/0210666 A1 | 7/2014 | Maltsev et al. | |
| 2015/0264584 A1 | 9/2015 | Dayanandan et al. | |

(Continued)

OTHER PUBLICATIONS

Cisco.Com, "Coverage Hole Detection and Mitigation Algorithm," Radio Resource Management White Paper, pp. 1-4, Accessed: Oct. 26, 2021.

(Continued)

*Primary Examiner* — Kenneth T Lam
(74) *Attorney, Agent, or Firm* — Patterson + Sheridan, LLP

(57) ABSTRACT

Flexible radio assignment with beamsteering antennas is provided by controlling a plurality of Access Points (APs) including steerable antennas to each transmit a first plurality of discovery frames at a first beamwidth; controlling the plurality of APs to steer the steerable antennas at a second beamwidth, less than the first beamwidth, to a plurality of steering angles; controlling the plurality of APs to each transmit a second plurality of discovery frames at each steering angle of the plurality of steering angles; determining an overlap in radio coverage among the plurality of APs based on the first plurality and the second plurality of discovery frames; and identifying redundant radios based on the overlap in radio coverage; and reassigning the redundant radios from use for client transmissions to a secondary role.

20 Claims, 10 Drawing Sheets

(56) References Cited

U.S. PATENT DOCUMENTS

| | | | |
|---|---|---|---|
| 2016/0127089 A1 | 5/2016 | Haghighat et al. | |
| 2016/0330643 A1 | 11/2016 | Sahin et al. | |
| 2017/0324439 A1 | 11/2017 | Desai et al. | |
| 2017/0374663 A1 | 12/2017 | Lee et al. | |
| 2018/0242160 A1* | 8/2018 | Morita | H04W 16/08 |
| 2019/0222279 A1 | 7/2019 | Xi et al. | |
| 2019/0319686 A1* | 10/2019 | Chen, IV | H04B 7/0617 |
| 2020/0128386 A1 | 4/2020 | Abdallah et al. | |
| 2020/0395664 A1 | 12/2020 | Athley et al. | |
| 2021/0135359 A1* | 5/2021 | Anderson | H01Q 25/002 |

OTHER PUBLICATIONS

PCT Notification of Transmittal of the International Search Report and The Written Opinion of The International Searching Authority, or The Declaration for Application PCT/US2020/057947 dated Jan. 21, 2021.

U.S. Appl. No. 17/451,527, filed Oct. 20, 2021.

Kripa Varma , "Software Functional Requirements to Support Marlin 4 Antennae on Cisco Axel APs and Wireless LAN Controllers," Cisco Systems, Dated Sep. 14, 2020, pp. 1-119.

* cited by examiner

US 11,791,554 B2

FLEXIBLE RADIO ASSIGNMENT WITH BEAMSTEERING ANTENNAS

TECHNICAL FIELD

Embodiments presented in this disclosure generally relate to radio role assignment in wireless networks. More specifically, embodiments disclosed herein related to wireless network using arrays of antennas that provide various controllable coverage patterns.

BACKGROUND

Wireless networking can suffer from interference when multiple radios are assigned to the same channel. This co-channel interference can be particularly problematic in dense dynamic environments, where many devices are present and changing locations over time and coverage ranges and channel assignments are adjusted to reflect the changing service environment.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
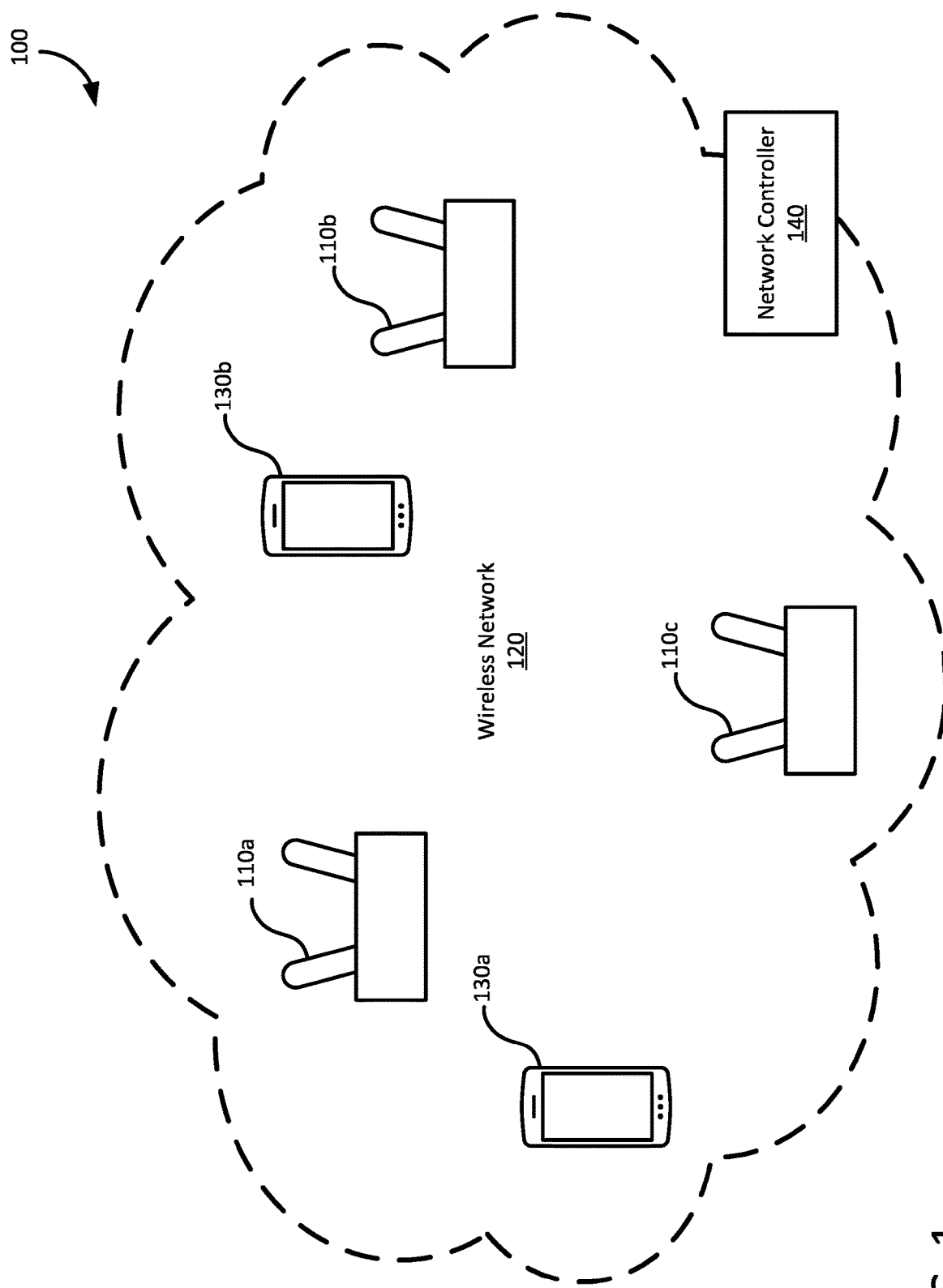
FIG. 1 illustrates a network environment, according to embodiments of the present disclosure.

One embodiment presented in this disclosure is a method, comprising: controlling a plurality of Access Points (APs) including steerable antennas to each transmit a first plurality of discovery frames at a first beamwidth; controlling the plurality of APs to steer the steerable antennas at a second beamwidth, less than the first beamwidth, to a plurality of steering angles; controlling the plurality of APs to each transmit a second plurality of discovery frames at each steering angle of the plurality of steering angles; determining an overlap in radio coverage among the plurality of APs based on the first plurality and the second plurality of discovery frames; and identifying redundant radios based on the overlap in radio coverage; and reassigning the redundant radios from use for client transmissions to a secondary role.

One embodiment presented in this disclosure is a system, comprising: a processor; and a non-transitory computer-readable storage medium storing instructions that when executed by the processor enable the processor to: control a plurality of Access Points (APs) including steerable antennas to each transmit a first plurality of discovery frames at a first beamwidth; control the plurality of APs to steer the steerable antennas at a second beamwidth, less than the first beamwidth, to a plurality of steering angles; control the plurality of APs to each transmit a second plurality of discovery frames at each steering angle of the plurality of steering angles; determine an overlap in radio coverage among the plurality of APs based on the first plurality and the second plurality of discovery frames; identify redundant radios based on the overlap in radio coverage; and reassign the redundant radios from use for client transmissions to a secondary role.

One embodiment presented in this disclosure is a memory including computer-readable instructions that when executed by a processor instruct the processor to perform operations, comprising: controlling a plurality of Access Points (APs) including steerable antennas to each transmit a first plurality of discovery frames at a first beamwidth; controlling the plurality of APs to steer the steerable antennas at a second beamwidth, less than the first beamwidth, to a plurality of steering angles; controlling the plurality of APs to each transmit a second plurality of discovery frames at each steering angle of the plurality of steering angles; determining overlap in radio coverage among the plurality of APs based on the first plurality and the second plurality of discovery frames; identifying redundant radios based on the overlap in radio coverage; and reassigning the redundant radios from use for client transmissions to a secondary role.

Example Embodiments

The present disclosure provides for flexible radio assignment in a wireless network that includes at least one antenna capable of programmable beamsteering. Beamsteering an antenna sets a directional antenna to aim the main signaling lobe thereof in a given direction in the environment and may be done electronically (i.e., the antenna remains stationary, but the direction in which the main lobe is projected changes) or physically (i.e., repositioning the antenna to move the corresponding main lobe).

The assignment of the various radios in the network environment to different roles when identified as redundant in the network environment includes considerations of the capabilities of the antennas used by the radios, including different power levels, different channels, beamsteering directions, and beam sizes. Accordingly, a set of radios can be flexibly assigned to different roles to match the networking demands of an environment not only based on the current configuration or set-up of the available radios, but the potential configurations or set-ups that the steerable antennas can be adjusted to provide.

FIG. 1 illustrates a network environment 100, according to embodiments of the present disclosure. In FIG. 1, one or more Access Points (APs) 110a-d (generally or collectively, AP 110) provide a wireless network 120 to various User Equipment (UE) 130a-b (generally or collectively UE 130) in the environment 100. In various aspects, the wireless network 120 is a cellular or Wi-Fi based network offered to users in a public or private venue. In various embodiments, the wireless network 120 includes a network controller 140 that communicates with the APs 110 to coordinate network management among the APs 110, although the APs 110 can also manage the network among themselves, thus omitting the network controller 140 in some embodiments.

The APs 110 can offer wireless communication sessions in the wireless network 120 according to various Radio Access Technologies (RAT) and communications standards such as, but not limited to, "Wi-Fi" networking according to the various families, sub-standards, and derivatives of the IEEE 802.11 standard, cellular networking including various generations and subtypes thereof, such as, Long Term Evolution (LTE) and Fifth Generation New Radio (5G NR) networks, Citizens Broadband Radio Service (CBRS) networks, or the like. Example hardware as may be included in an AP 110 is discussed in greater detail in regard to FIG. 6.

The UE 130 may include any computing device that is configured to wirelessly connect to one or more APs 110. Example UE 130 can include, but are not limited to: smart phones, feature phones, tablet computers, laptop computers, desktop computers, Internet of Things (IoT) devices, and the like. In various embodiments, the UE 130 can also be referred to as a station (STA), a client device (CD), a user device, or an endpoint. Example hardware as may be included in a UE 130 is discussed in greater detail in regard to FIG. 6.

The network controller 140, if included, may include any computing device or cloud based service that is configured to interface with two or more APs 110 to coordinate how spectrum and services are shared in the environment 100. The network controller 140 can be provided on a separate computing device connected to the individual APs 110 via wired or wireless communications, may be included with a "central" or "commander" AP 110, or may be provided in an ad hoc arrangement via a collective of two or more APs 110 negotiating among themselves for network management. Accordingly, any action ascribed to the network controller 140 in an example given in the present disclosure may also or instead be ascribed to one or more of the APs 110. Example hardware as may be included in a network controller 140 is discussed in greater detail in regard to FIG. 6.

Each AP 110 may include multiple radios that are used in different roles in providing the wireless network 120. For example, a first radio may be tuned for a first frequency and a second radio is tuned for a second frequency. In another example, two radios tuned to the same frequency may offer different dispersion patterns or beam shapes, such as a first radio that uses an antenna that provides an omnidirectional signal and a second radio that uses an antenna that provides a directional or beam-formed signal.

Some of the antennas used by the APs 110 may be omnidirectional, and disperse transmission power evenly in every directions, although the precise coverage in the environment 100 of an omnidirectional signal from a given AP 110 can be based on the transmission power of the AP 110 and any intervening objects that may disrupt signal transmission.

In additional to omnidirectional ranges, some APs 110 can include antennas or antenna arrays capable of directional transmission. Directional transmission allows, for an equivalent power to an omnidirectional transmission, more power to be focused in a given direction. For example, an AP 110 can use a directional antenna to produce a directional coverage range, also referred to as a beam-formed range, that focuses the transmission energy to a certain area in the environment 100. In various embodiments, a beam-formed range may extend past the omnidirectional range of the associated AP 110 using the same or less transmission power than the equivalent omnidirectional signal. In various embodiments, the beam-formed ranges are provided by beam steerable antenna arrays, which allow the direction in the environment 100 that the directional antenna projects the directional signal to change; steering where the beam-formed range projects from the AP 110.

In various embodiments, some of the APs 110 include radios that can switch between using different antennas, such as an omnidirectional antenna and a steerable directional antenna, to send and receive signal thereby. For example, the switchable radio may use a first antenna in some situations and the second antenna in other situations to switch between using omnidirectional signaling patterns and directional signaling patterns in different use cases.

As part of managing the wireless network 120, the network controller 140 identifies the arrangement of the radios of the various APs 110 to provide various roles in the wireless network 120. In various embodiments, radio of a given AP 110 may be set to as a network monitor (e.g., to monitor signal characteristics), a network sniffer (e.g., to monitor types or content of traffic carried in the network), a client-server (e.g., single band or dual band to provide uplink/downlink communications to/from a UE 130), a backhaul server (e.g., single band or dual band to provide communications with another AP 110 or network), or the like. Additionally, since some APs 110 may include multiple radios, a given AP 110 may include different radios assigned to different roles (e.g., one in a network sniffer role and one in a client-serving role). In various embodiments, a radio may be assigned to a power conservation role, and is turned off or is otherwise disabled.

The role that the network controller 140 assigns to a given radio may depend on the location of the associated AP 110 in the environment 100, a type of the antenna used by the radio (e.g., omnidirectional, directional and steerable, directional and static), range that a directional antenna can be steered to, where the UE 130 are located in the environment 100, what the interference and signaling patterns in the environment 100 are like, what frequency the antenna uses, how the various frequencies are allocated for use in the environment 100, and combinations thereof. Accordingly, the network controller 140 collects device capabilities and signaling characteristics over the wireless network 120 to manage what roles to assign individual radios across the wireless network 120.

Figure 2A:
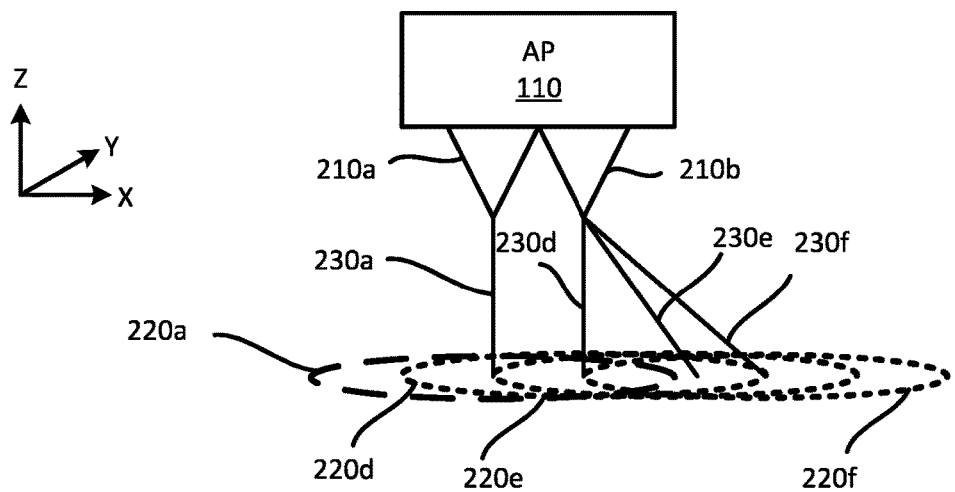
FIGS. 2A-2F illustrate coverage ranges for an antenna array using the steerable beam arrays included therein, according to embodiments of the present disclosure.
Figure 2B:
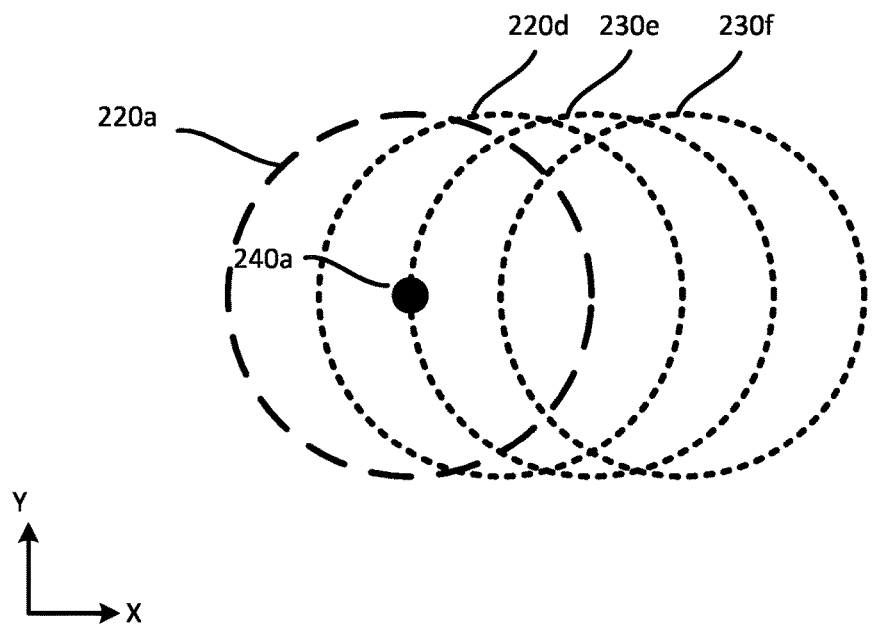
Figure 2C:
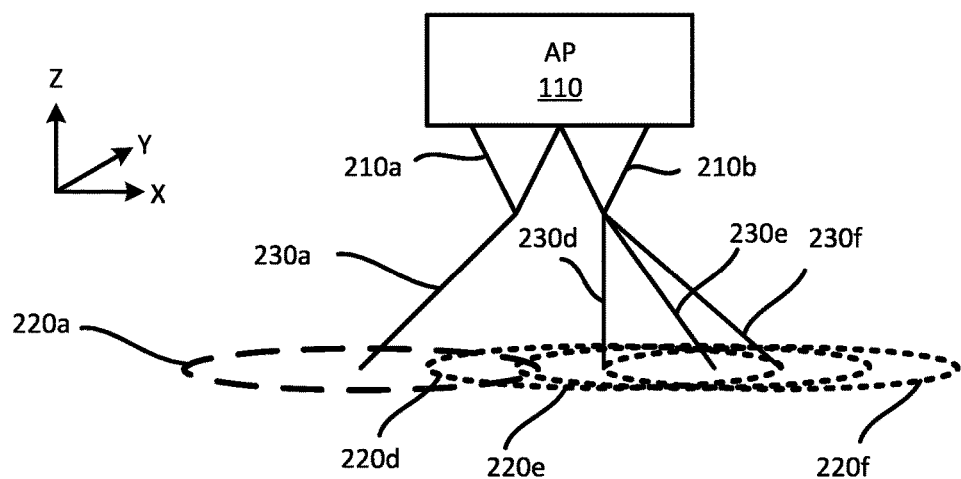
Figure 2D:
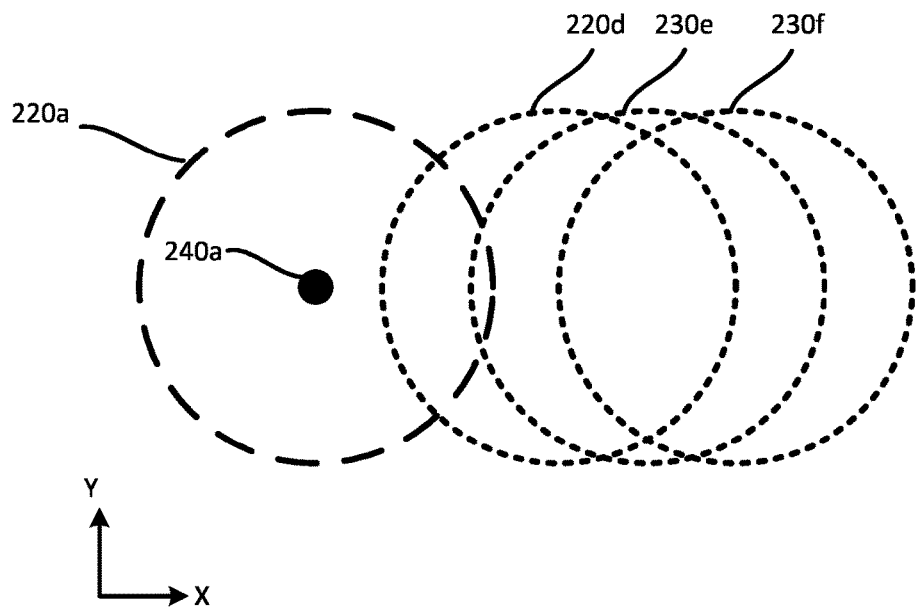
Figure 2E:
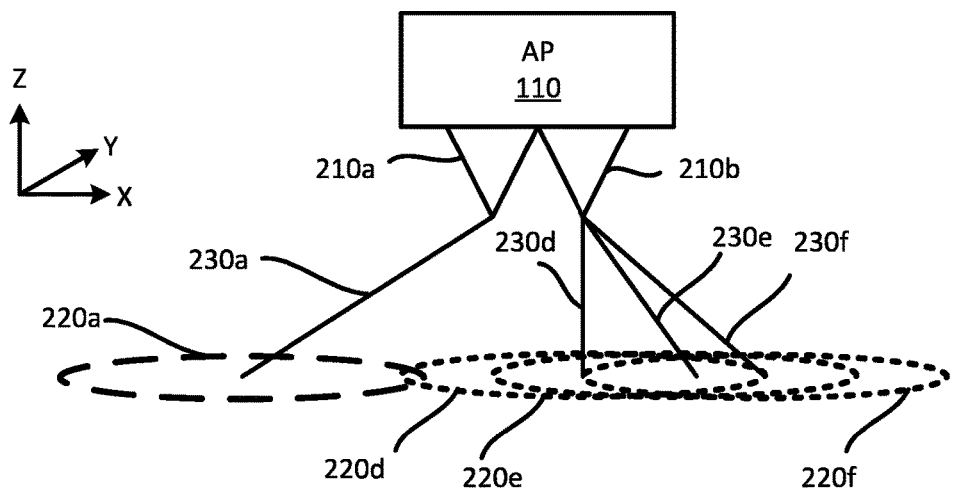
Figure 2F:
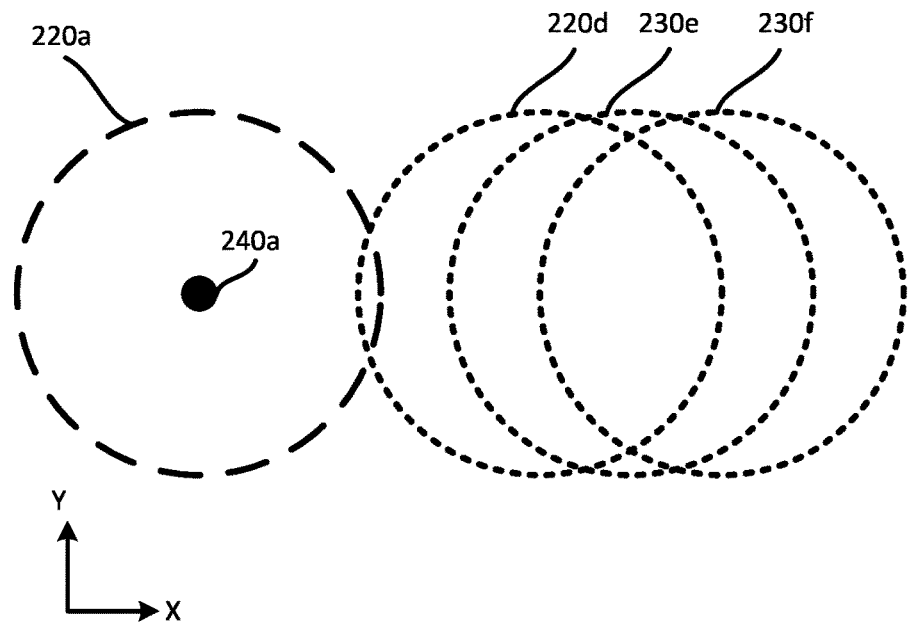

FIGS. 2A-2F illustrate coverage ranges 220a-f for an AP 110 including a radio with a steerable antenna array using steerable beam arrays 210a, 210b included therein, according to embodiments of the present disclosure. FIGS. 2A, 2C, and 2E provide isometric views of the coverage ranges 220a-f in relation to the AP 110 and the steerable beam arrays 210a, 210b, while FIGS. 2B, 2D, and 2F provide overhead views of the coverage ranges 220a-f (e.g., in the YX plane). When using the steerable beam arrays 210a, 210b, an AP 110 can send and receive signals with various devices located within the respective coverage ranges 220a-f for those steerable beam arrays 210a, 210b. The steerable beam arrays 210a, 210b generate respective steerable beams 230a-f (i.e., beams that are steerable to different angles of transmission relative to the steerable beam arrays 210a, 210b) to generate the corresponding coverage ranges 220a-f, 220b centered at a given point 240a-c in the environment. As illustrated, the steerable beams 230a-f are shown at the center of the corresponding coverage ranges 220a-f, emanating from the respective steerable beam arrays 210a, 210b.

Each of FIGS. 2A-2F illustrate three potential steering arrangements for the second steerable beam array 210b in relation to one potential steering arrangement for the first steerable beam array 210a in a given figure. Each of the steerable beam arrays 210a, 210b are independently and separately steerable from one another, and thus in embodiments with X potential steering arrangements, there are $X^2$ potential overall arrangements. For example, a first and second steerable beam array 210a, 210b each with three potential steering states provide a total of nine different potential steering arrangements.

FIGS. 2A and 2B illustrate the first steerable beam array 210a producing a steerable beam 230a having a first steerable coverage range 220a in a first position and the fourth, fifth, and sixth steerable beams 230d-f that the second steerable beam array 210b can produce with the respective fourth, fifth, and sixth steerable coverage ranges 220d-f. The first steerable coverage range 220a and the fourth steerable coverage range 220d form a boresight coverage pattern, with significant overlap between the coverage ranges of the different steerable beam arrays 210a, 210b (e.g., a greatest amount of overlap of the potential patterns). As the second steerable beam array 210b steers the steerable beams from the fourth position 230d to the fifth position 230e and from the fifth position 230e to the sixth position 230f (i.e., further away from the first steerable coverage range 220a than the fourth coverage range 220d), the overlap between the coverage ranges decreases. Although the first coverage range 220a is illustrated as having at least some overlap with the fifth and sixth coverage range 220e-f in FIGS. 2A and 2B, in various embodiments, spatial isolation can exist between the first coverage range 220a and one or more of the fifth and sixth coverage ranges 220e-f, where no overlap exists between the respective coverage ranges.

FIGS. 2C and 2D illustrate the first steerable beam array 210a producing a steerable beam 230b having a second steerable coverage range 220b in a second position and the fourth, fifth, and sixth steerable beams 230d-f that the second steerable beam array 210b can produce with the respective fourth, fifth, and sixth steerable coverage ranges 220d-f. The second steerable coverage range 220b provides less overlap and/or more spatial isolation to the fourth, fifth, and sixth coverage ranges 220d-f than the first steerable coverage range 220a does respectively.

FIGS. 2E and 2F illustrate the first steerable beam array 210a producing a steerable beam 230c having a third steerable coverage range 220c in a third position and the fourth, fifth, and sixth steerable beams 230d-f that the second steerable beam array 210b can produce with the respective fourth, fifth, and sixth steerable coverage ranges 220d-f. The third steerable coverage range 220c and the sixth steerable coverage range 220f form an expanded linear coverage pattern, with significant spatial isolation between the coverage ranges of the different steerable beam arrays 210a, 210b (e.g., a greatest amount of spatial isolation of the potential patterns). The third steerable coverage range 220c provides less overlap and/or more spatial isolation to the fourth, fifth, and sixth coverage ranges 220d-f than the second steerable coverage range 220b does respectively.

Figure 3:
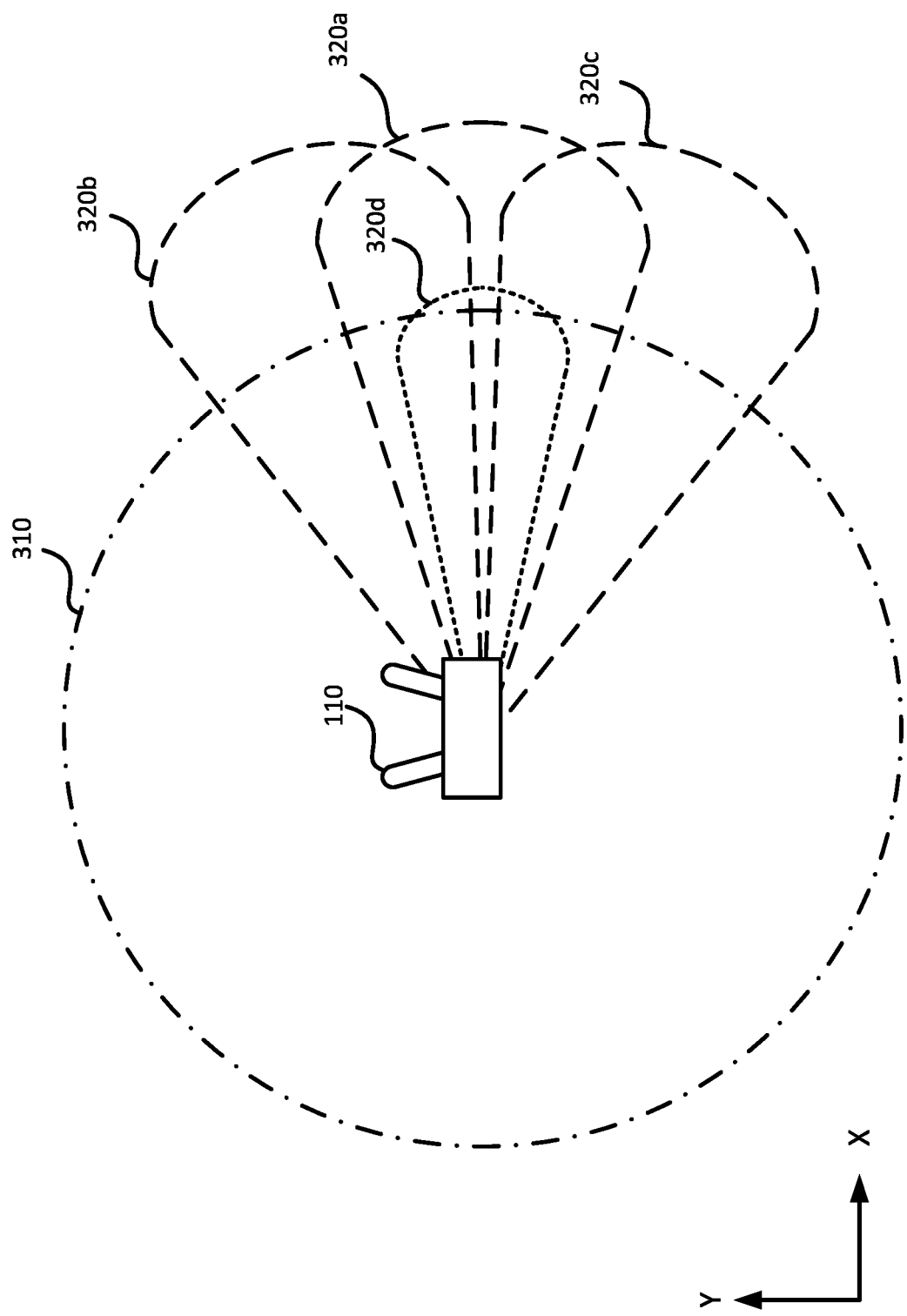
FIG. 3 illustrates a comparison between an omnidirectional range and several beam-formed ranges of an AP, according to embodiments of the present disclosure.

FIG. 3 illustrates a comparison between an omnidirectional range 310 and several beam-formed ranges 320a-d (generally or collectively, beam-formed range 320) of an AP 110, according to embodiments of the present disclosure. In various embodiments, an AP 110 capable of beam-forming can include various antennas that can be set up to produce different beam-formed ranges 320. Additionally or alternatively, an AP 110 can include more than one directional antenna (which may be static or steerable) that are configured to produce several different beam-formed ranges 320. In various embodiments, the steerable directional antennas of the AP 110 are physically steered (e.g., by mechanically rotating a directional antenna to point in a given direction) or electrically steered (e.g., via a phased array on antennas applying different phase offset to a signal to produce a desired constructive and destructive interference pattern at the signal generation source).

Each of the illustrated beam-formed ranges 320a-d shown in FIG. 3 are the result of different beamforming arrangements, which can include using different directional antennas, different mechanical settings for rotating a directional antenna, different phase offsets to electrically steer a beam generated by a directional antenna, different transmission power levels, different carrier frequencies, and combinations thereof. Although illustrated in FIG. 3 with four beam-formed ranges 320a-d, in various embodiments, an AP 110 can have more than or fewer than four beamforming arrangements, and thus more or fewer than four beam-formed ranges 320a-d.

For example, the AP 110 can steer the directional antenna in the XY plane (rotating about the Z axis) to the first through third beamforming arrangements to produce the corresponding first through third beam-formed ranges 320a-c. Similarly, the AP 110 can steer the directional antenna from the first beamforming arrangement in the YZ plane (rotating about the X axis) to steer the primary lobe "downward" to produce the fourth beamforming arrangement and the fourth beam-formed range 320d. Additionally or alternatively, the AP 110 can reduce the transmission power of the directional antenna, so that the first beam-formed range 320a and the fourth beam-formed range 320d are both produced with the same directional antenna steered to the same angle, but with lower transmission power for the fourth beam-formed range 320d relative to the first beam-formed range 320a.

Figure 4A:
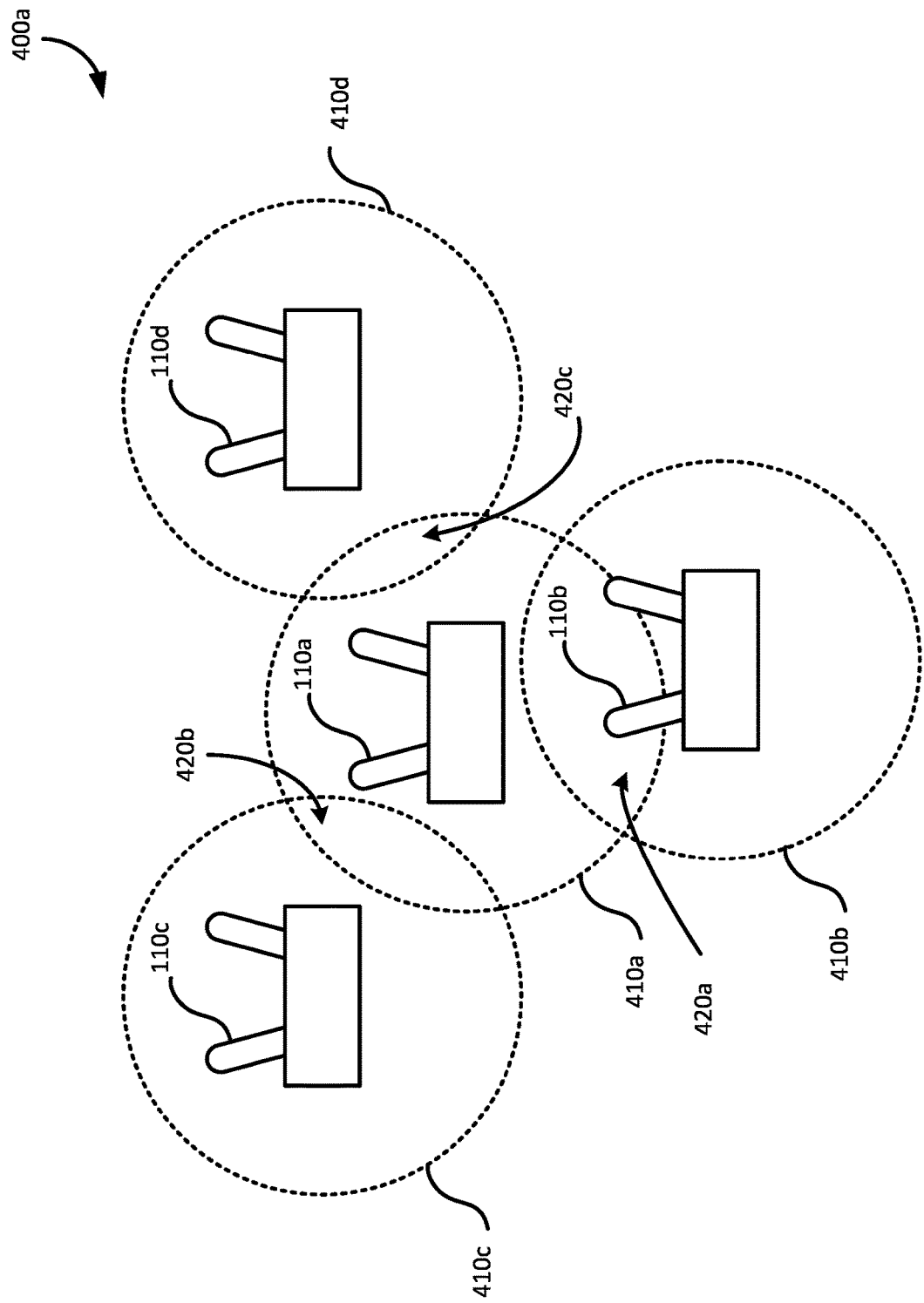
FIGS. 4A-4C illustrate comparison between different coverage alignments for a plurality of APs, according to embodiments of the present disclosure.
Figure 4B:
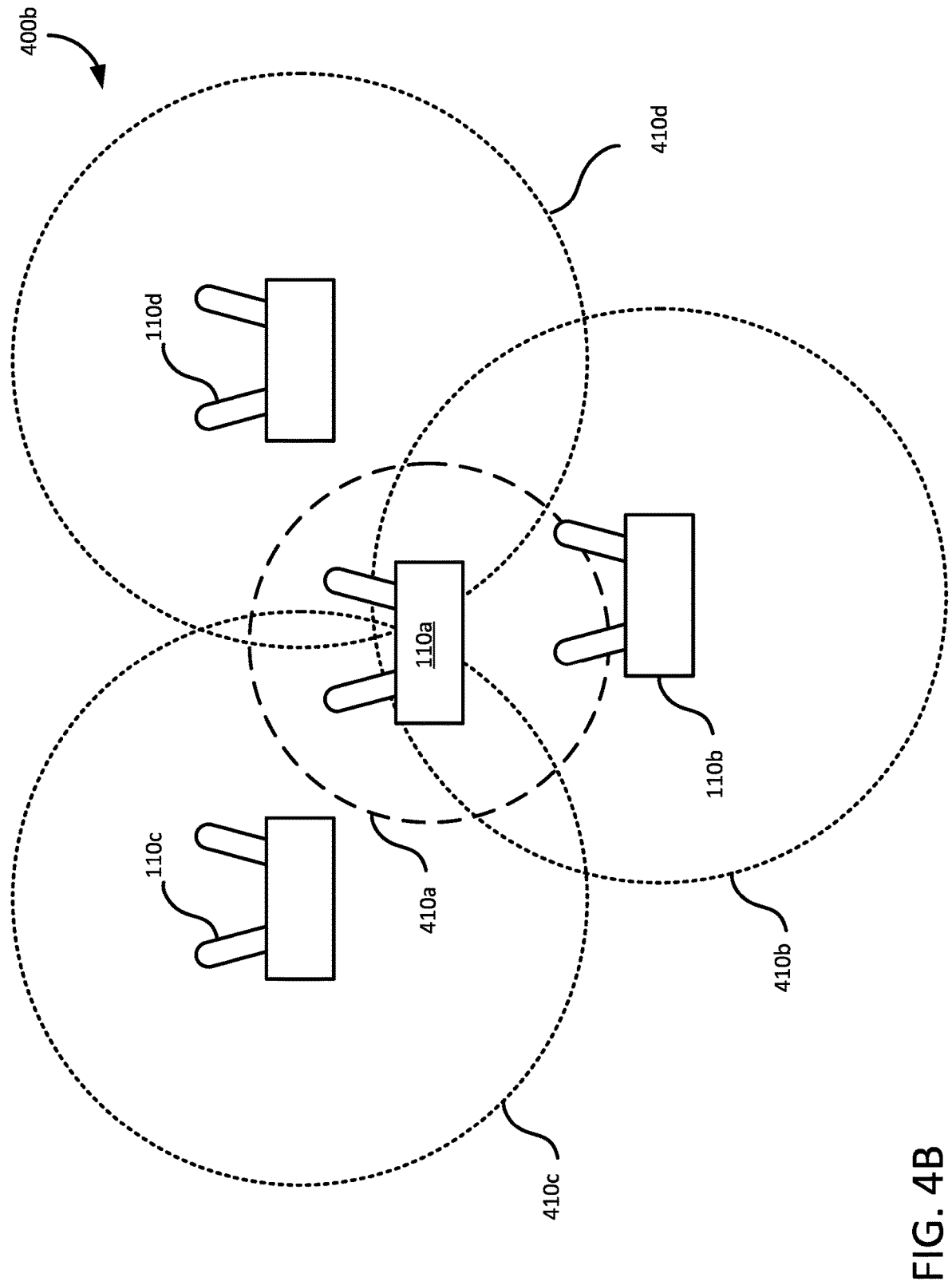
Figure 4C:
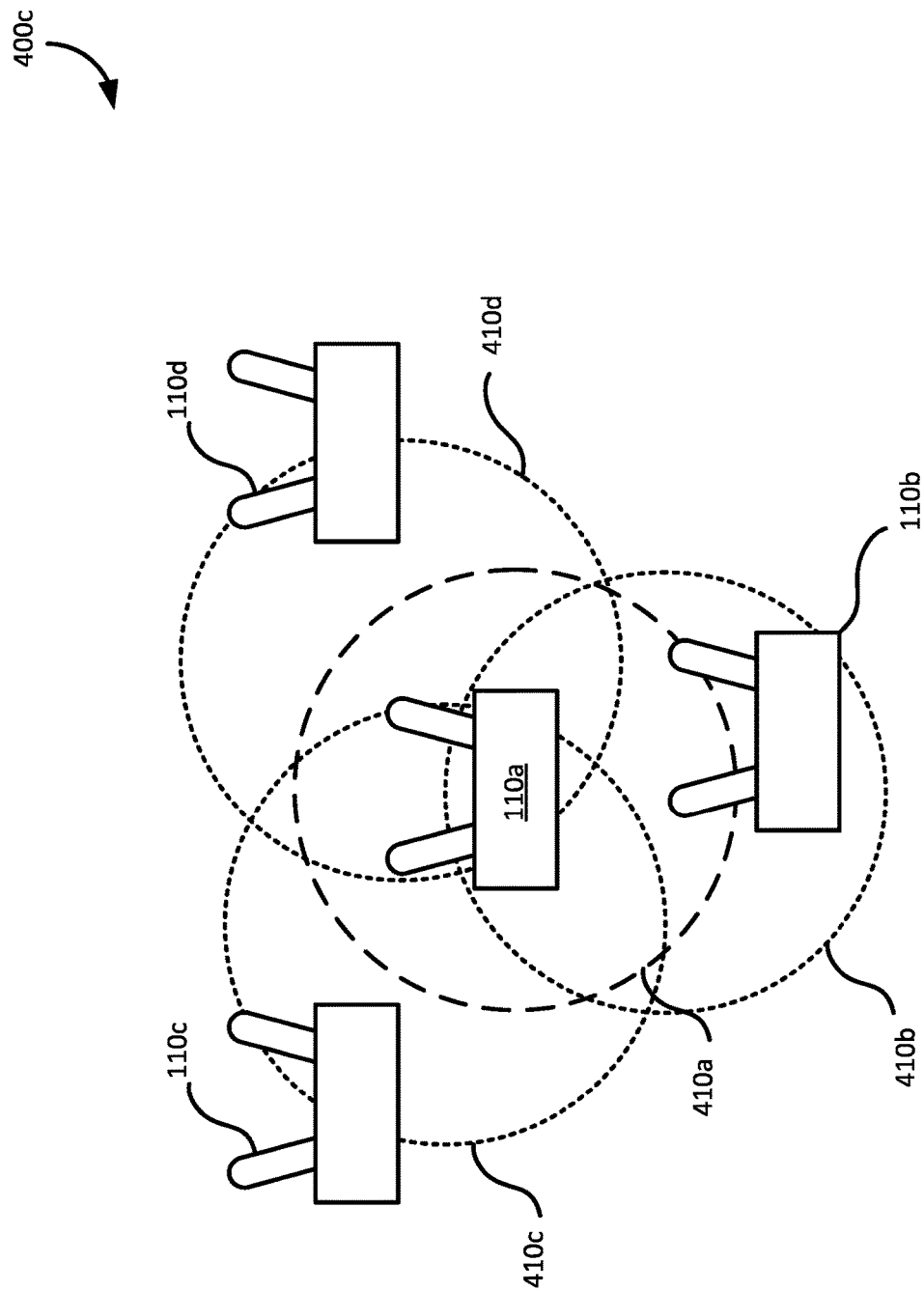

Depending on the particular beamforming arrangements available for the AP 110 to select between and the positions of the APs 110 in the environment 100, various signaling ranges may partially or fully overlap one another. These overlaps may include single-AP overlaps (as shown in FIG. 3) or multi-AP overlaps (as shown in FIGS. 4A-4C). Accordingly, if the first beam-formed range 320a is used to transmit data from the AP 110 to a UE 130 within that range, the AP 110 could potentially use the second through fourth beam-formed ranges 320b-d instead to communicate with that UE 130. However, other APs 110 may also attempt to communicate with a UE 130

Various environmental factors can affect the overlapping ranges of the various beam-formed ranges 320 and the omnidirectional range 310. Therefore, the AP 110 performs various sounding operations to determine the transmission power and steering arrangement in the specific environment where the AP 110 is deployed to account for multi-pathing and various environmental interference sources. However, sounding for one beamforming arrangement does not provide AP 110 with statistical or definitive knowledge about different beamforming arrangements. Accordingly, a UE 130 can be assigned to the same channel by the associated AP 110 and receive cross-talk from other UEs 130 or APs 110 than the associated AP 110.

FIGS. 4A-4C illustrate comparison between different coverage alignments 400a-c (generally or collectively, coverage alignment 400) for a plurality of APs 110, according to embodiments of the present disclosure.

The coverage alignments 400 include four AP 110a-d, each with a corresponding coverage range 410a-d (generally or collectively, coverage range 410) with some degree of overlap between neighboring APs 110. The coverage ranges 410 of coordinated APs 110 can be purposely set up with overlapping regions 420a-c (generally or collectively, overlapping region 420) to allow for seamless handoff of UEs 130 from one AP 110 to another or to provide potential coverage across a designated area in the environment.

Because the APs 110 include several antennas, some of which may have different coverage areas or steerable coverage areas, the coverage alignments 400 for the APS 110 may change based on which antenna is selected for use, and how that antenna is steered to produce the associated coverage range 410. For example, FIG. 4A shows a first coverage alignment 400a, where a first AP 110a provides a first coverage range 410a that partially overlaps with a second coverage range 410b (associated with a second AP 110b), a third coverage range 410c (associated with a third AP 110c), and a fourth coverage range 410d (associated with a fourth AP 110d).

As shown in FIGS. 4B and 4C, each of the APs 110a-d shown in FIG. 4A remain in the same position, but the coverage ranges 410b-d of the APs b-d change, rendering the first coverage range 410a redundant. Because the other coverage ranges 410b-d cover all of the first coverage range 410a, the network controller 140 can assign the first coverage range 410a to a different role than the other coverage ranges 400b-d or deactivate the first coverage range 410a. For example, when the other coverage ranges 410b-d are used in a client-serving role to communicate with various UEs 130, the first coverage range 410a can be used in a network monitoring or traffic sniffing role; observing the network conditions or traffic sent and received by the other APs 110b-d.

FIG. 4B illustrates a second coverage alignment 400b that renders the first coverage range 410a redundant. As shown, the second through fourth APs 110b-d have expanded the associated coverage ranges 410b-d to completely overlap the first coverage range 410a; rendering the first coverage range 410a redundant in the second coverage alignment 400b. In various aspects, a given AP 110 can change the size of the corresponding coverage range 410 by changing the transmission power, selecting a different antenna (e.g., a wider beam antenna versus a narrower beam antenna), or combinations thereof. Additionally or alternatively, the expanded coverage ranges 410b-d shown in FIG. 4B may represent the collectively potential coverage ranges of steerable antennas.

FIG. 4C illustrates a third coverage alignment 400c that renders the first coverage range 410a redundant. As shown, the second through fourth APs 110b-d have steered the associated coverage ranges 410b-d to completely overlap the first coverage range 410a; rendering the first coverage range 410a redundant in the third coverage alignment 400c. In various aspects, a given AP 110 can change the relative location of the corresponding coverage range 410 by electronically or physically steering an antenna.

In various aspects, when a coverage range 410 is designated as redundant, the network controller 140 may designate the associated antenna as redundant or the configuration of the radio as redundant. For example, a radio with an omnidirectional antenna (e.g., with one configuration) may be designated as redundant when at least one coverage alignment 400 of the potential coverage alignments 400 renders the corresponding coverage range 410 redundant, or when only when the chosen coverage alignment 400 renders the corresponding coverage range 410 redundant. In another example, a radio using a steerable directional antenna with several configurations (e.g., at least a first steering arrangement and a second steering arrangement) may be designated as redundant when steered to a first steering arrangement, and not designated as redundant when steered to a second steering arrangement where the resulting coverage range 410 is fully overlapped in the first steering arrangement and not in the second steering arrangement. Alternatively, the steerable directional antenna may be designated as redundant when at least one steering arrangement is fully overlapped, even when the other steering arrangements are not fully overlapped.

In examples where the radio includes two or more antennas to select between (e.g., a first antenna and a second antenna), the network controller 140 independently determines whether each antenna is redundant. For example, an omnidirectional antenna may offer a first coverage range 410a that is not completely overlapped by other APs 110, while a directional antenna may offer several coverage ranges, where some or all of the coverage ranges are completely overlapped by other APs 110. Accordingly, the omnidirectional antenna may be marked as non-redundant, while the directional antenna is marked as redundant in some or all of the corresponding steering arrangements.

Figure 5:
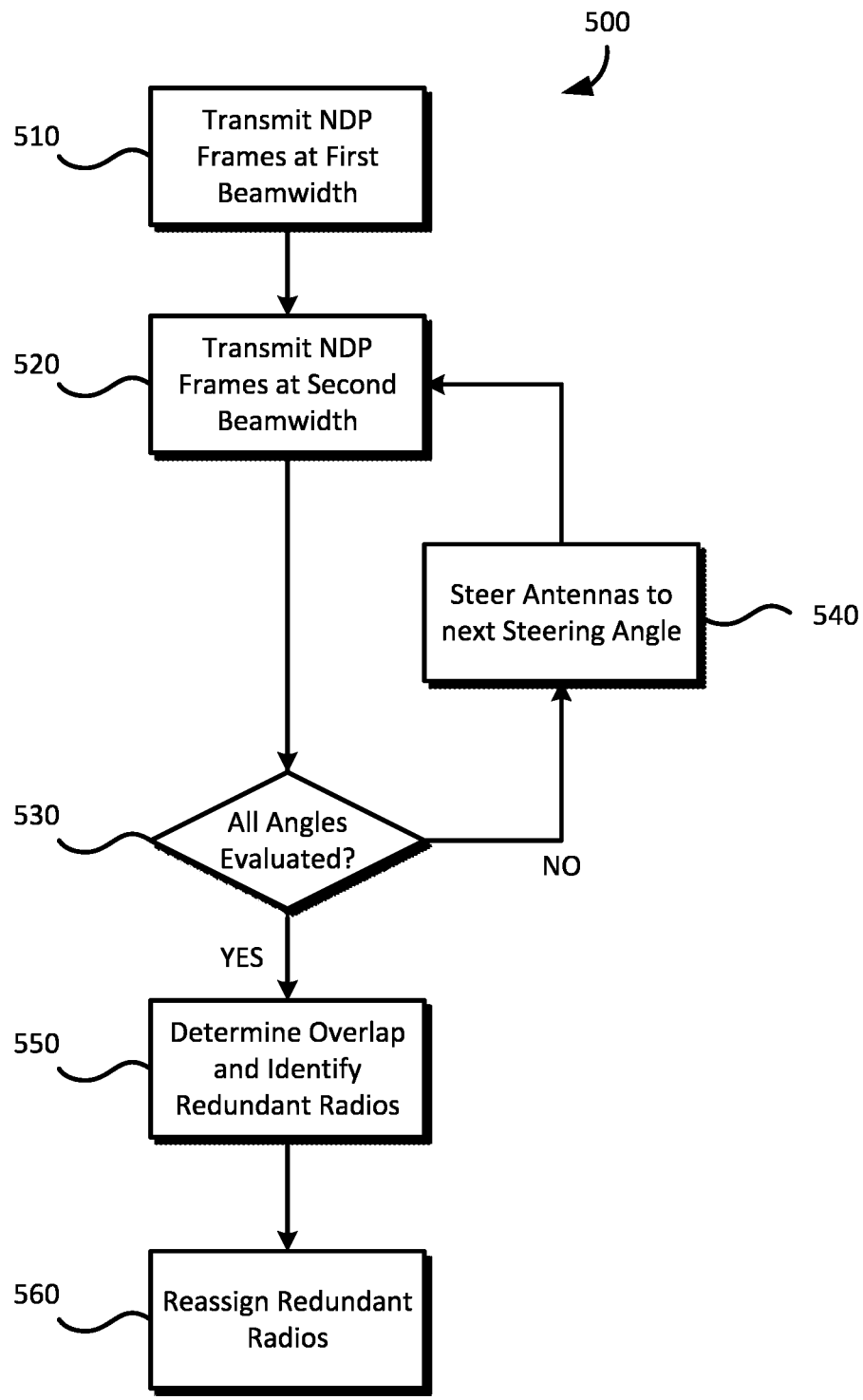
FIG. 5 is a flowchart of a method for flexible radio assignment with beamsteering antennas, according to embodiments of the present disclosure.

FIG. 5 is a flowchart of a method 500 for flexible radio assignment with beamsteering antennas, according to embodiments of the present disclosure. Method 500 begins at block 510, where a network controller 140 controls or otherwise signals a plurality of APs 110 that provide a wireless network 120 to transmit a first plurality of discovery frames, such as neighbor discovery protocol (NDP) frames, using antennas set at a first beamwidth. In various embodiments, the first beamwidth is a wide beamwidth for a non-steerable or static antenna in the APs 110.

At block 520, the network controller 140 controls or otherwise signals the plurality of APs 110 that include steerable antennas to transmit a second plurality of discovery frames at a second beamwidth, different from the first beamwidth (per block 510). In various embodiments, the steerable antennas are included in an antenna array with the static antennas for the APs 110, where one of the steerable or static antennas may be active at a given time, in which the steerable antenna provides a narrower beamwidth than the static antenna, but can steer where the coverage range of the beam is directed in the environment 100.

At block 530, the network controller 140 determines whether all of the steering angles for the steerable antennas have been evaluated. When all of the angles have been evaluated, method 500 proceeds to block 550. Otherwise, when not all of the angles have been evaluated, method 500 proceeds to block 540.

At block 540, the network controller 140 steers the steerable antennas to the next steering angle, and returns to block 520 to transmit another discovery frame, at the updated steering angle. Accordingly, the network controller 140 steers the steerable antennas through a plurality of coverage alignments 400 to identify the various neighbors of the APs 110 when using different beamsteering arrangements. In various embodiments, the network controller 140 steers the steerable antennas through individual coverage alignments in parallel with one another to explore the different steering angles, but not the different combined coverage alignments 400 for the wireless network 120. For example, if a first antenna and a second antenna are both capable of steering between three angles, the network controller 140 may steer the two antennas to the first angle, the second angle, and the third angle to test all three steering angles rather than steering first antenna through the first through third angles while the second antenna is in the first angle, steering first antenna through the first through third angles while the second antenna is in the second angle, and steering first antenna through the first through third angles while the second antenna is in the third angle.

In various embodiments, the discovery frames are transmitted (per one or more of block 510 and block 520) at a highest transmission power for each of the antennas using the first beamwidth, and the network controller 140 coordinates when the APs 110 transmit the discovery frames to avoid interference between individual NDP frames of the plurality of discovery frames. For example, a given AP 110 may be scheduled to send an over the air message including a discovery frame every X seconds on one or more available channels by one or more antennas set to transmit according to a selected beamwidth and steering angle (if the antenna is steerable).

To aid in analysis of how the steerable antennas and the associated coverage ranges interact, in various embodiments the discovery frames include elements that indicate the power level, beamwidth, and steering angle (or static/steerable status) for the associated antenna used to transmit the corresponding discovery frame. Additional elements included in the discovery frame can include an identifier for the sending radio, and Internet Protocol (IP) address of the AP 110, channels used by the AP 110, antenna pattern, etc.

When an AP 110 receives a discovery frame (e.g., an NDP frame) sent by another AP 110, the receiving AP 110 forwards discovery frame (or a subset thereof) to the network controller 140 along with a measurement of strength of the signal, such as a Received Signal Strength Indicator (RSSI) value. In various embodiments, the RSSI value is scaled according to one or more of the beamwidth configuration of the source antenna for the discovery frame, relative locations of the transmitting radio and the receiving radio in the environment 100, and an expected pathloss between the transmitting radio and the receiving radio. For example, the RSSI of a discovery frame transmitted by an antenna in wide beam configuration can be scaled up to account for narrow beam configurations without having to wait for the sender to switch its beam configuration.

In various embodiments, when a given AP 110 in the plurality of APs 110 does not include antennas that offer two different beamwidths, the network controller 140 may omit one of block 510 or block 520 for the given AP 110. For example, for an AP 110 that includes only static (e.g., non-steerable) antennas, the network controller 140 omits performing block 520-540 for the associated radios. Similarly, for an AP 110 that includes only steerable antennas, the network controller 140 omits performing block 510 for the associated radios.

At block 550, the network controller 140 determines overlap between the various coverage ranges that the AP 110 have been cycled through and identifies any radios (or antennas thereof) that are redundant in the wireless network 120. The network controller 140 uses the RSSI values calculated by the APs 110 that received discovery frames to calculate the coverage areas of the various antenna arrangements and identify when the range of one AP 110 is partially or fully overlapped by the coverage ranges of one or more other APs 110. Although some overlap in radio coverage between neighboring APs 110 (e.g., APs 110 that receive signals of at least a threshold RSSI from one another) is necessary for load balancing and handing off UE 130 between different APs 110, complete overlap of a coverage range renders a radio redundant.

After marking a radio as redundant, the network controller 140 may steer or hand off any associated UE 130 from the associated AP 110 to another AP 110 in the wireless network 120 with overlapping coverage in order to avoid connectivity issues for the end user.

At block 560, the network controller 140 reassigns the radios identified as redundant (per block 550) from a client serving role to a secondary role. In various embodiments, the secondary role instructs the associated AP 110 to use the radio in a network monitor role or a network sniffer role to observe the network conditions or traffic sent and received by the other APs 110. Additionally or alternatively, the network controller 140 assigns redundant radios to an inactive secondary role or otherwise (temporarily) turns off the radio to conserve power in the wireless network 120. In some embodiments, the network controller evaluates whether to assign a radio marked in one channel or band as redundant for a client-serving role to a different channel or band, where the radio may not be redundant.

Because radios with steerable antennas (or the option to use steerable antennas) offer several advantages in flexibility over radios with only static antennas, in various embodiments, the network controller 140 prioritizes coverage alignments 400 that mark non-steerable antennas/radios as redundant over coverage alignments 400 that mark steerable antennas/radios as redundant. Stated differently, when given the option to mark one of a steerable antenna/radio and a non-steerable antenna/radio as redundant, the network controller 140 marks the non-steerable antenna/radio as redundant (all other factors being equal). In various embodiments, this preference for steerable antennas is examined as part of Neighbor Density Metric (NDM), providing a user configurable boost to the NDM for radios with steerable antennas versus with static antennas.

Accordingly, by reassigning the redundant radios to different roles, the network controller 140 ensures that sufficient overlap exists in radio coverage ranges for the AP 110 in the wireless network 120 without over coverage and identifies effective uses for those otherwise redundant radios/antennas. Method 500 may then conclude.

Figure 6:
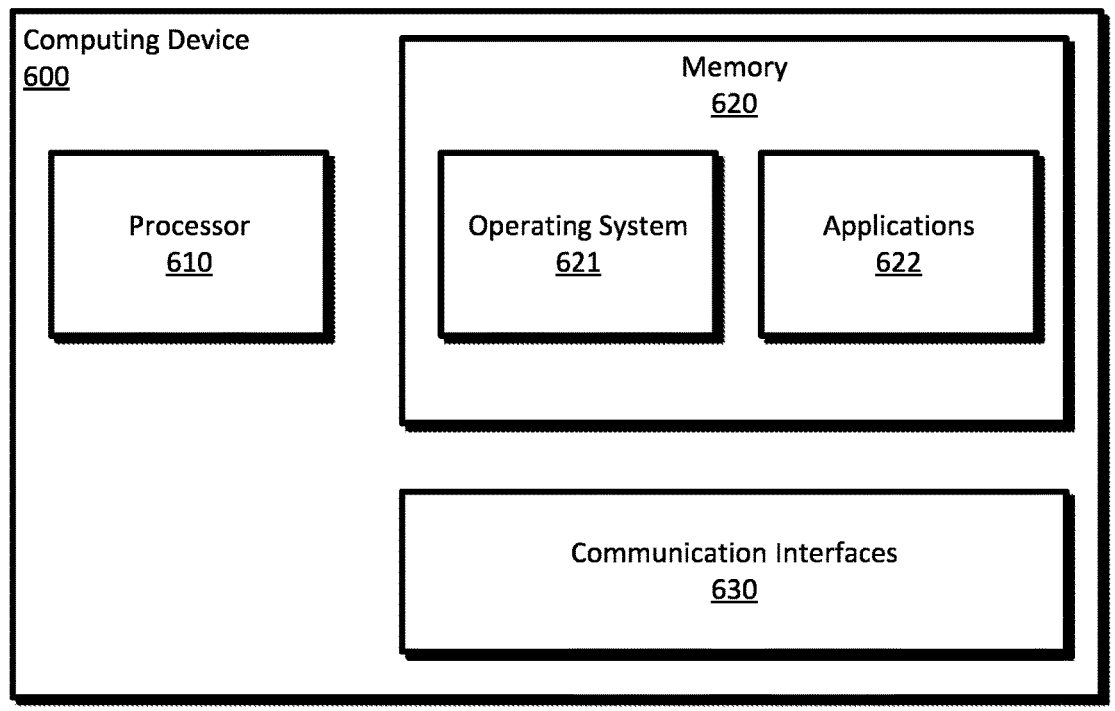
FIG. 6 illustrates hardware of a computing device, according to embodiments of the present disclosure.

FIG. 6 illustrates hardware of a computing device 600 such as can be included in an AP 110, a UE 130, or a network controller 140 as described herein. The computing device 600 includes a processor 610, a memory 620, and communication interfaces 630. The processor 610 may be any processing element capable of performing the functions described herein. The processor 610 represents a single processor, multiple processors, a processor with multiple cores, and combinations thereof. The communication interfaces 630 facilitate communications between the computing device 600 and other devices. The communication interfaces 630 are representative of wireless communications antennas (both omnidirectional and directional), various steering mechanisms for the antennas, and various wired communication ports including out-pins and in-pins to a microcontroller. The memory 620 may be either volatile or non-volatile memory and may include RAM, flash, cache, disk drives, and other computer readable memory storage devices. Although shown as a single entity, the memory 620 may be divided into different memory storage elements such as RAM and one or more hard disk drives.

As shown, the memory 620 includes various instructions that are executable by the processor 610 to provide an operating system 621 to manage various functions of the computing device 600 and one or more applications 622 to provide various functionalities to users of the computing device 600, which include one or more of the functions and functionalities described in the present disclosure. In addition, the embodiments herein can be stored on a non-transitory computer-readable storage medium which can include the memory 620, compact disks (CDs), digital versatile disk (DVD), and the like.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B" or "at least one of A or B," it will be understood that embodiments including element A exclusively, including element B exclusively, and including element A and B are each contemplated. Additionally, multiple instances of elements A or B are contemplated, include multiple instances of element A exclusively, multiple instances of element B exclusively, multiple instances of element A and a single instance of element B, a single instance of element A and multiple instances of element B, and multiple instances of both element A and element B. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:
1. A method, comprising:
controlling a plurality of Access Points (APs) including steerable antennas to each transmit a first plurality of discovery frames at a first beamwidth;
controlling the plurality of APs to steer the steerable antennas at a second beamwidth, less than the first beamwidth, to a plurality of steering angles;

controlling the plurality of APs to each transmit a second plurality of discovery frames at each steering angle of the plurality of steering angles;
determining an overlap in radio coverage among the plurality of APs based on the first plurality and the second plurality of discovery frames;
identifying redundant radios based on the overlap in radio coverage; and
reassigning the redundant radios from use for client transmissions to a secondary role.

2. The method of claim 1, wherein the first plurality and the second plurality of discovery frames are transmitted at a highest transmission power for each AP of the plurality of APs.

3. The method of claim 1, wherein the first plurality and the second plurality of discovery frames indicate a beamwidth and an angle of steering for an associated antenna that sends a given discovery frame.

4. The method of claim 1, wherein the plurality of APs further include non-steerable antennas, wherein identifying redundant radios prioritizes identifying the non-steerable antennas as redundant over the steerable antennas.

5. The method of claim 1, wherein determining the overlap in radio coverage further comprises:
scaling Received Signal Strength Indicators (RSSI) based on at least one of:
a beamwidth configuration of a source antenna in the plurality of APs,
relative locations of transmitting radios and receiving radios, and
an expected pathloss between the transmitting radios and the receiving radios.

6. The method of claim 1, wherein the plurality of APs include at least one AP including a radio associated with a static antenna and a steerable antenna, wherein the radio is configured to select one of the static antenna and the steerable antenna to send and receive signals thereby.

7. The method of claim 1, wherein the secondary role is a network monitoring role.

8. A system, comprising:
a processor; and
a memory storing instructions that when executed by the processor enable the processor to:
control a plurality of Access Points (APs) including steerable antennas to each transmit a first plurality of discovery frames at a first beamwidth;
control the plurality of APs to steer the steerable antennas at a second beamwidth, less than the first beamwidth, to a plurality of steering angles;
control the plurality of APs to each transmit a second plurality of discovery frames at each steering angle of the plurality of steering angles;
determine an overlap in radio coverage among the plurality of APs based on the first plurality and the second plurality of discovery frames;
identify redundant radios based on the overlap in radio coverage; and
reassign the redundant radios from use for client transmissions to a secondary role.

9. The system of claim 8, wherein the first plurality and the second plurality of discovery frames are transmitted at a highest transmission power for each AP of the plurality of APs.

10. The system of claim 8, wherein the first plurality and the second plurality of discovery frames indicate a beamwidth and an angle of steering for an associated antenna that sends a given discovery frame.

11. The system of claim 8, wherein the plurality of APs further include non-steerable antennas, wherein identifying redundant radios prioritizes identifying the non-steerable antennas as redundant over the steerable antennas.

12. The system of claim 8, wherein determining the overlap in radio coverage further comprises:
scaling Received Signal Strength Indicators (RSSI) based on at least one of:
a beamwidth configuration of a source antenna in the plurality of APs,
relative locations of transmitting radios and receiving radios, and
an expected pathloss between the transmitting radios and the receiving radios.

13. The system of claim 8, wherein the plurality of APs include at least one AP including a radio associated with a static antenna and a steerable antenna, wherein the radio is configured to select one of the static antenna and the steerable antenna to send and receive signals thereby.

14. The system of claim 8, wherein the secondary role is a network sniffer role.

15. A non-transitory computer-readable storage medium including computer-readable instructions that when executed by a processor instruct the processor to perform operations, comprising:
controlling a plurality of Access Points (APs) including steerable antennas to each transmit a first plurality of discovery frames at a first beamwidth;
controlling the plurality of APs to steer the steerable antennas at a second beamwidth, less than the first beamwidth, to a plurality of steering angles;
controlling the plurality of APs to each transmit a second plurality of discovery frames at each steering angle of the plurality of steering angles;
determining overlap in radio coverage among the plurality of APs based on the first plurality and the second plurality of discovery frames;
identifying redundant radios based on the overlap in radio coverage; and
reassigning the redundant radios from use for client transmissions to a secondary role.

16. The non-transitory computer-readable storage medium of claim 15, wherein the first plurality and the second plurality of discovery frames are sent at a highest transmission power for each AP of the plurality of APs.

17. The non-transitory computer-readable storage medium of claim 15, wherein the first plurality and the second plurality of discovery frames indicate a beamwidth and an angle of steering for an associated antenna that sends a given discovery frame.

18. The non-transitory computer-readable storage medium of claim 15, wherein the plurality of APs further include non-steerable antennas, wherein identifying redundant radios prioritizes identifying the non-steerable antennas as redundant over the steerable antennas.

19. The non-transitory computer-readable storage medium of claim 15, wherein determining the overlap in radio coverage further comprises:
scaling Received Signal Strength Indicators (RSSI) based on at least one of:
a beamwidth configuration of a source antenna in the plurality of APs,
relative locations of transmitting radios and receiving radios, and
an expected pathloss between the transmitting radios and the receiving radios.

20. The non-transitory computer-readable storage medium of claim 15, wherein the plurality of APs include at least one AP including a radio associated with a static antenna and a steerable antenna, wherein the radio is configured to select one of the static antenna and the steerable antenna to send and receive signal thereby.

\* \* \* \* \*

UNITED STATES PATENT AND TRADEMARK OFFICE
CERTIFICATE OF CORRECTION

PATENT NO. : 11,791,554 B2
APPLICATION NO. : 17/457330
DATED : October 17, 2023
INVENTOR(S) : Santosh B. Kulkarni et al.

Page 1 of 1

It is certified that error appears in the above-identified patent and that said Letters Patent is hereby corrected as shown below:

In the Specification

In Column 6, Line 46, delete "130" and insert -- 130. --.

In Column 7, Line 20, delete "APs b-d" and insert -- APs 110b-d --.

Signed and Sealed this
Sixteenth Day of July, 2024

Katherine Kelly Vidal
*Director of the United States Patent and Trademark Office*